US009453353B2

(12) United States Patent
Last

(10) Patent No.: US 9,453,353 B2
(45) Date of Patent: Sep. 27, 2016

(54) TWO-PIECE DETACHABLE BRACKET FOR SUPPORTING POOL DECK-LID MODULES COVERING BELOW DECK TROUGHS HOUSING POWERED POOL COVER SYSTEMS

(71) Applicant: Harry J Last, Kailua, HI (US)

(72) Inventor: Harry J Last, Kailua, HI (US)

( * ) Notice: Subject to any disclaimer, the term of this patent is extended or adjusted under 35 U.S.C. 154(b) by 0 days.

(21) Appl. No.: 14/885,703

(22) Filed: Oct. 16, 2015

(65) Prior Publication Data

US 2016/0123526 A1 May 5, 2016

Related U.S. Application Data

(60) Provisional application No. 62/074,054, filed on Nov. 2, 2014.

(51) Int. Cl.
*E04H 4/14* (2006.01)
*E04H 4/10* (2006.01)
*F16B 2/06* (2006.01)

(52) U.S. Cl.
CPC .............. *E04H 4/14* (2013.01); *E04H 4/101* (2013.01); *E04H 4/108* (2013.01); *F16B 2/065* (2013.01)

(58) Field of Classification Search
CPC ....... F16B 2/065; E04H 4/101; E04H 4/108; E04H 4/14
USPC .............. 248/220.22, 205.1, 235, 250; 52/3; 4/502
See application file for complete search history.

(56) References Cited

U.S. PATENT DOCUMENTS

| 2,982,508 | A | * | 5/1961 | Sigwald | ............... | A47B 57/565 |
| | | | | | | 248/205.1 |
| 6,446,276 | B2 | | 9/2002 | Mathis | | |
| 6,769,141 | B2 | | 8/2004 | Epple et al. | | |
| 6,862,756 | B2 | | 3/2005 | Mathis | | |
| 6,886,188 | B2 | | 5/2005 | Epple et al. | | |
| 7,011,782 | B2 | | 3/2006 | Smith | | |
| 7,318,243 | B2 | | 1/2008 | Smith | | |
| 7,694,356 | B2 | | 4/2010 | Bouiss | | |
| 8,438,671 | B2 | | 5/2013 | Last | | |
| 2003/0046805 | A1 | * | 3/2003 | Mathis | ................ | E04H 4/101 |
| | | | | | | 29/525.02 |
| 2003/0084617 | A1 | * | 5/2003 | Smith | ................ | E04H 4/101 |
| | | | | | | 52/3 |
| 2004/0149397 | A1 | * | 8/2004 | Last | ................ | E04H 4/082 |
| | | | | | | 160/133 |

* cited by examiner

*Primary Examiner* — Anita M King
(74) *Attorney, Agent, or Firm* — David E. Newhouse, Esq.

(57) ABSTRACT

Two-piece detachable bracket for supporting heavy pool-deck lid modules covering below deck troughs housing powered pool cover systems is described.

1 Claim, 7 Drawing Sheets

Fig. 2 Exploded right rear perspective view of the two-piece bracket

TWO-PIECE DETACHABLE BRACKET FOR SUPPORTING POOL DECK-LID MODULES COVERING BELOW DECK TROUGHS HOUSING POWERED POOL COVER SYSTEMS

RELATED APPLICATIONS

This application relates to and claims the benefits conferred by U.S. Provisional Patent Application Ser. No. 62/074,054 filed by Applicant Harry J. Last on Nov. 2, 2014 entitled "Two-Piece Detachable Bracket for Supporting Pool-Deck Lid Modules Covering Below Deck Troughs Housing Powered Pool Cover Systems", the entirety of which is incorporated herein by reference.

BACKGROUND OF THE INVENTION

1. Field of the Invention

The present invention relates generally to automatic swimming pool cover systems, and, in particular to brackets for supporting heavy pool-deck lids covering below-deck troughs housing pool cover systems.

2. Description of the Prior Art

Typical deck-lid structures covering troughs housing automatic pool cover systems include brackets secured to or incorporated into a back wall of a housing trough with support arms cantilevered across the trough for supporting heavy modular lid plates or composition trays that in turn integrate, in appearance, with deck top and coping surfaces on, and topping the pool walls.

Repair access to the housing trough is accomplished by lifting the modular lid plates/trays off the supporting cantilever support arms. [See U.S. Pat. Nos. 7,318,243 & 7,011,782, Smith, U.S. Pat. Nos. 6,886,188, & 6,769,141 Epple et al, and U.S. Pat. Nos. 6,862,756 & 6,446,276, Mathis.] Major repairs to the housed pool cover system require removal and re-installation of both the heavy lid modules and the underlying support brackets secured to the back wall of the trough. [See U.S. Pat. No. 7,694,356, Bouiss.]

As noted by Applicant in U.S. Pat. No. 8,438,671, Last [Col. 10, 11. 55-67], pool decks vary in thickness essentially requiring lid modules to be field fabricated [See U.S. Pat. No. 7,011,782, Smith.] Variations in elevation also invariably occur between cooperating elements of constructed pools, the associated field constructed housing troughs, and the components of field assembled installed pool cover systems. Other complications, affecting design of pool-deck lid brackets include pool cover cabling that traverses along the back wall of the housing trough from one end of the trough to the other end coupling one side of the pool cover to the cable windup reels typically located at motor end of the pool cover system on the other side of the pool.

Simply stated, bracket systems for supporting heavy modular lid plates or composition trays must be sturdy, easy to remove, easy to re-install, and adjustable to allow for alignment of the lid modules with each other and with the surrounding pool deck and pool coping and support structures.

SUMMARY OF THE INVENTION

A robust, adjustable, two-piece, detachable cantilever bracket system for supporting heavy pool-deck lid modules covering a below-deck trough housing an automatic pool cover system includes:

a) A removable, structural arm presenting a planar plate underlying and supporting a pool-deck lid module having an orthogonal base plate with a spaced pair of bolt ports located proximate to the top of the base plate and a spaced pair of threaded tilt ports located proximate to the bottom corners of the base plate.

b) A clamping plate having bolt ports sized and located for registry with the spaced pair bolt ports through base plate of the structural arm.

c) A formed wall anchor presenting a vertical planar mounting plate elevated by integral, vertical side-wall plates with coaxial openings for accommodating transverse cabling of a pool cover system, and having oppositely extending, co-planar, vertical wall mounting flanges adapted to be bolted to an inside back wall of a below-deck trough, where the planar mounting plate has a pair of parallel slots depending vertically down from its top edge, sized and positioned for registry with the bolt ports through the base plate of the structural arm.

d) A plurality of bolts for securing outward extending, co-planar flange plates of the wall anchor mount to an inside vertical back wall of the below deck trough.

e) A pair of bolts and nuts securing the base plate of the structural arm to the wall anchor structure for clamping and unclamping the slotted vertical planar mounting plate of the formed wall anchor between the base plate of the structural arm and the clamping plate at a selectable elevation in the depending parallel vertical slots of the vertical planar mounting plate; and f) a pair of tilt adjustment, set screws sized for screwing through the threaded tilt ports at the bottom corners of the base plate for tilting the base plate of the lid support arm relative to the planer face plate of the wall anchor mount for determining and adjusting an angle of extension of the structural arm of the two-piece, detachable cantilever bracket.

FEATURES AND ADVANTAGES

The described, robust, adjustable, two-piece, detachable cantilever bracket system accommodates pool cover cabling systems that traverse across the back wall of the pool cover trough conveniently proximate the top of the trough enabling the pool cover system cover function upon removal of the heavy pool-deck lid modules and the detachable support arms for service and maintenance.

The formed wall anchors are easily aligned for mounting levelly along a back wall of a pool cover trough before installation of an automatic pool cover system in the trough housing.

Once the formed wall anchors are bolted to the back wall of a pool cover trough, the pool cover system can be installed, removed and reinstalled for operational testing and debugging without complications of a plurality of overhanging structural cantilever arms. Further once the heavy pool-deck lid modules are lifted off the cantilevered structural arms, the underlying structural arms can be easily detached from the wall anchors allowing for unencumbered testing and debugging the cover pool system components housed in the trough and otherwise.

The slotted vertical planar mounting plate of the formed wall anchors enables installation and removal of the structural arms by simply loosening the nuts just enough for easily slipping the structural arm off the vertical planar mounting plate of the wall anchor. In addition, the slots allow for selectively adjusting the elevation of any particular heavy pool-deck lid module supported on a pair of support arms, i.e. to allow for flush alignment of the pool-deck lid modules with each other and with the pool surround.

Sandwiching and bolting the slotted vertical planar mounting plate of the formed wall anchors between the orthogonal base plate of the cantilevered structural arm and the clamping plate increases the frictional contact precluding downward slippage and, as well, increases the stiffness of the coupling.

The set screws at the bottom of the orthogonal base plate of the structural arm tilt the base plate of the lid support arm relative to the planer face plate of the wall anchor for determining and adjusting angles of inclination of the cantilevered structural arm of the two-piece, detachable cantilever bracket.

The set screws could alternatively be installed threaded tilt ports proximate the bottom of the vertical planar mounting plate of the formed wall anchor.

The width of the planar plates of removable the structural arms upon which the pool-deck lids rest can be selected for positioning below a junction of adjacent deck-lid modules, such that each deck-lid module spans between, and is supported between a pair of brackets.

DESCRIPTION OF PREFERRED AND EXEMPLARY EMBODIMENTS

Figure 1:
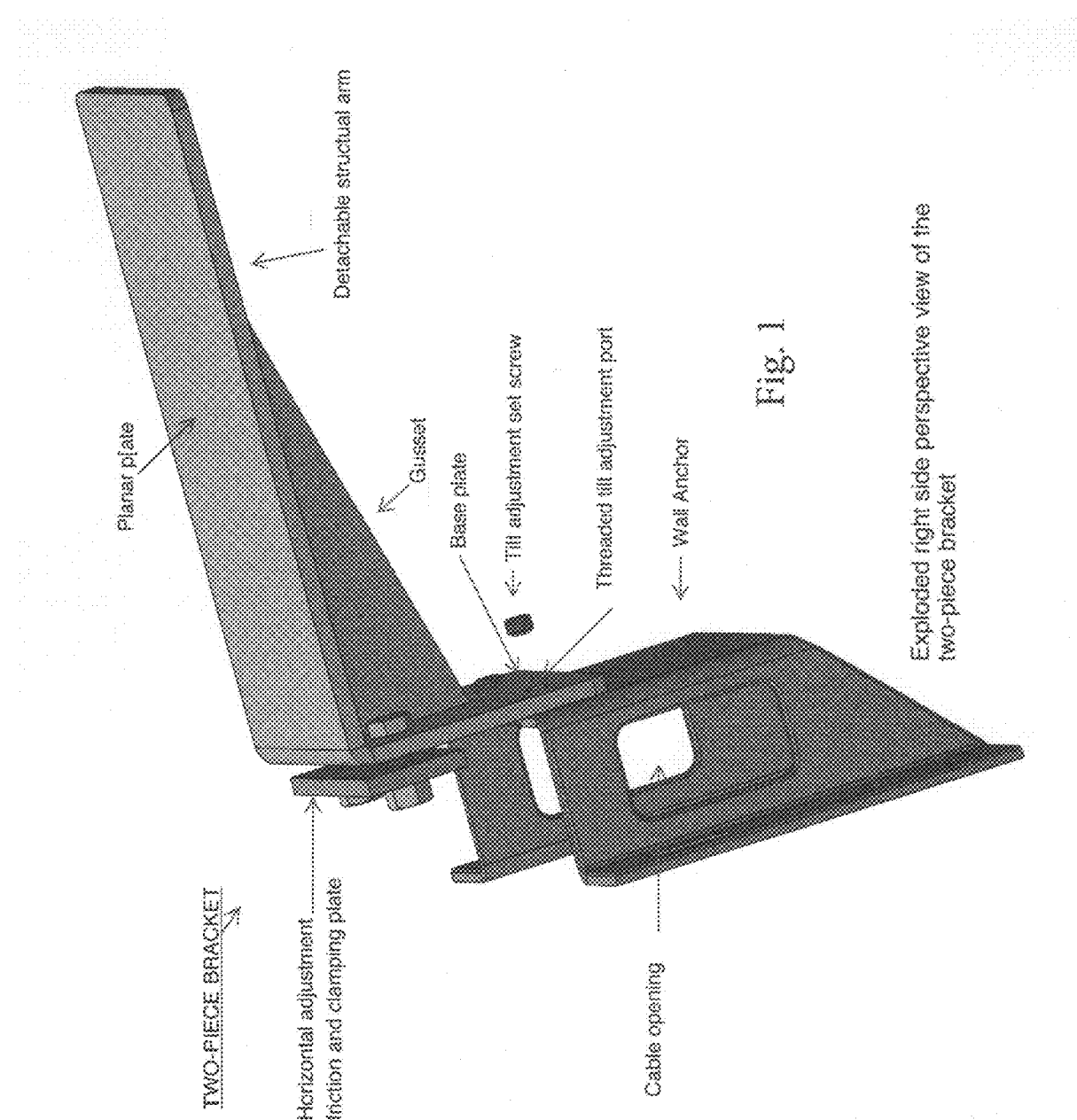
FIG. 1 is a decoupled right side perspective view of the two-piece detachable bracket.
Figure 2:
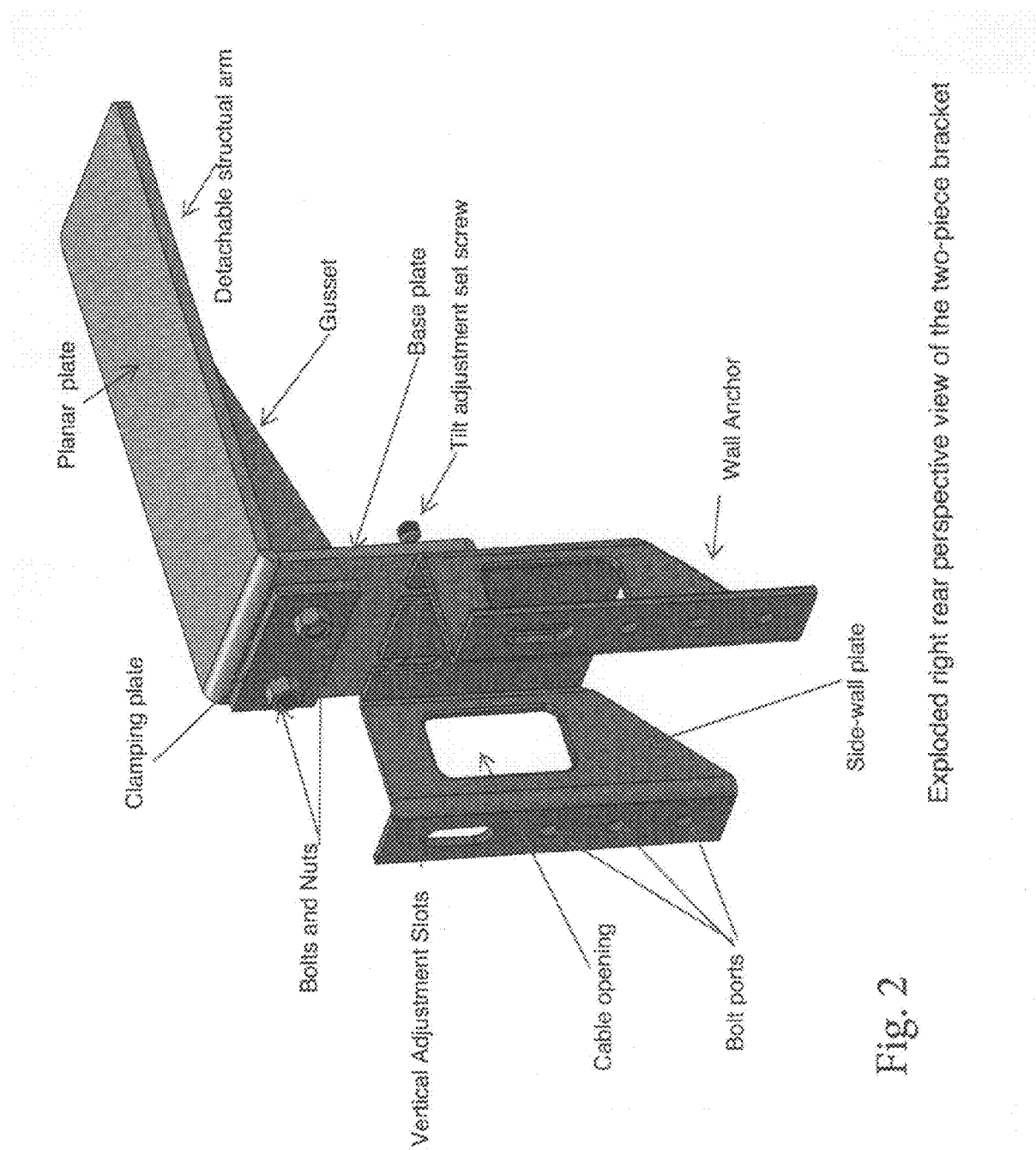
FIG. 2 is a decoupled right rear perspective view of the two-piece detachable bracket.
Figure 3:
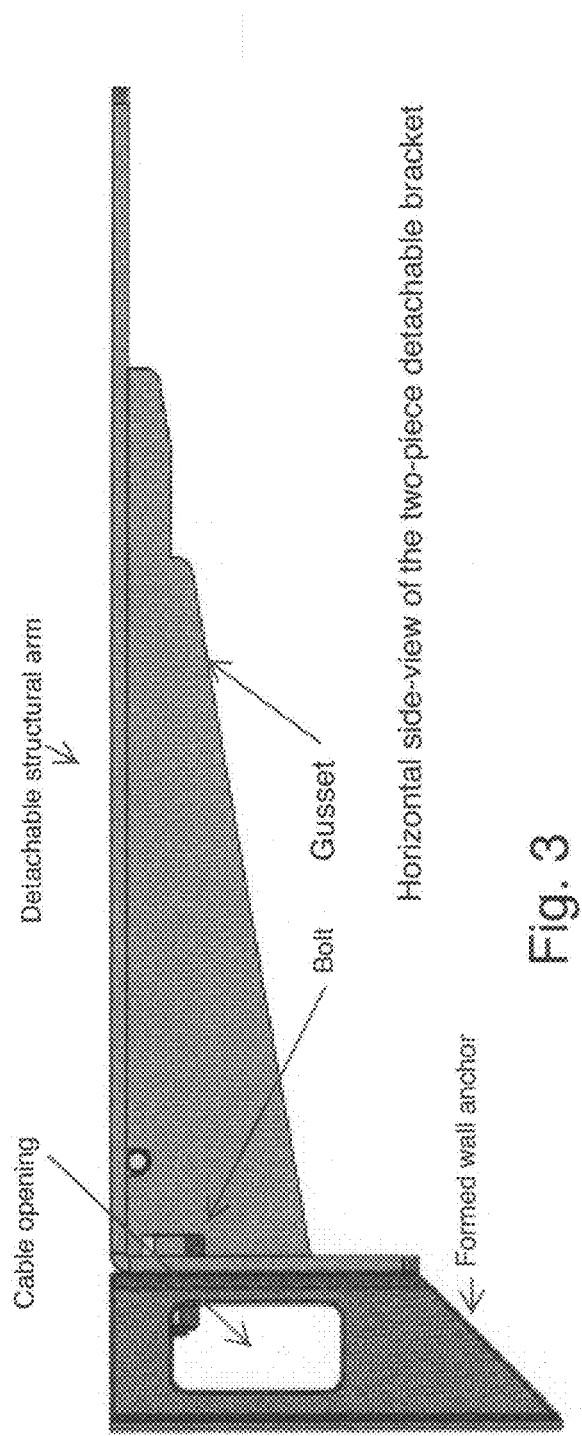
FIG. 3 is a side view of the assembled two-piece detachable bracket.
Figure 4:
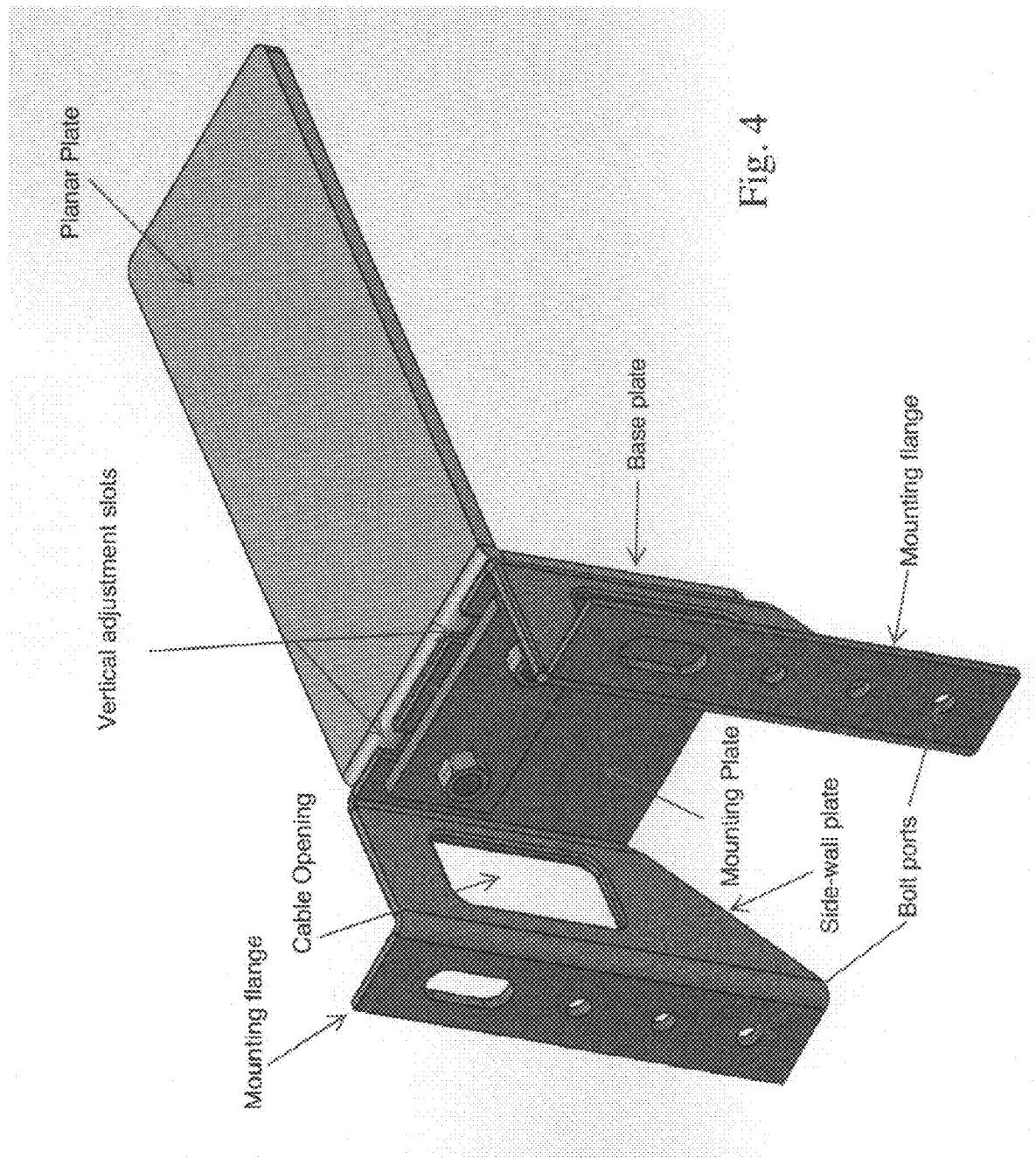
FIG. 4 is a back, right side perspective view of the assembled two-piece detachable bracket.

FIGS. 1-2 present right side and right rear perspective views of a decoupled relationship of the basic structural components of an adjustable, two-piece, detachable cantilever bracket, namely a wall anchor, a detachable structural arm, a rectangular clamping plate and tilt adjustment set screws.

As illustrated in FIGS. 1-5, & 7, the wall anchor may be formed from any bendable structural material (carbon steel), any extruded structural material (aluminum alloys), or any cast structural material (grey cast iron). The formed wall anchor presents a vertical planar mounting plate elevated by integral, vertical side-wall plates with coaxial openings for accommodating transverse cabling of a pool cover system and perpendicular, oppositely extending co-planar mounting flanges with bolt ports. The planar mounting plate of the wall anchor has a pair of parallel vertical slots depending down from its top edge sized and spaced to register with bolt ports or holes through a orthogonal base plate of a detachable structural arm. The co-planar mounting flanges are bolted to an inside back wall of a below-deck pool cover trough. (See FIG. 7).

The a detachable structural arm (FIGS. 1-6) includes a extending planar top plate with an orthogonal base plate with a spaced pair of bolt ports located proximate to a top end of the base plate located to register with the pair of parallel vertical slots depending down from the top edge of the vertical planar mounting plate of the wall anchor. A pair of threaded, tilt adjustment ports are located proximate the bottom of the orthogonal base plate. A vertically oriented, centrally located gusset plate is preferably welded to the underside or formed integrally with planar top plate and/or welded to or formed integrally with the front face of the orthogonal base plate. The gusset reinforces the junction between the planar plate and the orthogonal base plate of the arm. Like the wall anchor, the components of the detachable structural arms are made of selected structural materials, based upon expected loading of the cantilevered structural arms by the particular deck-lid structures.

Figure 5:
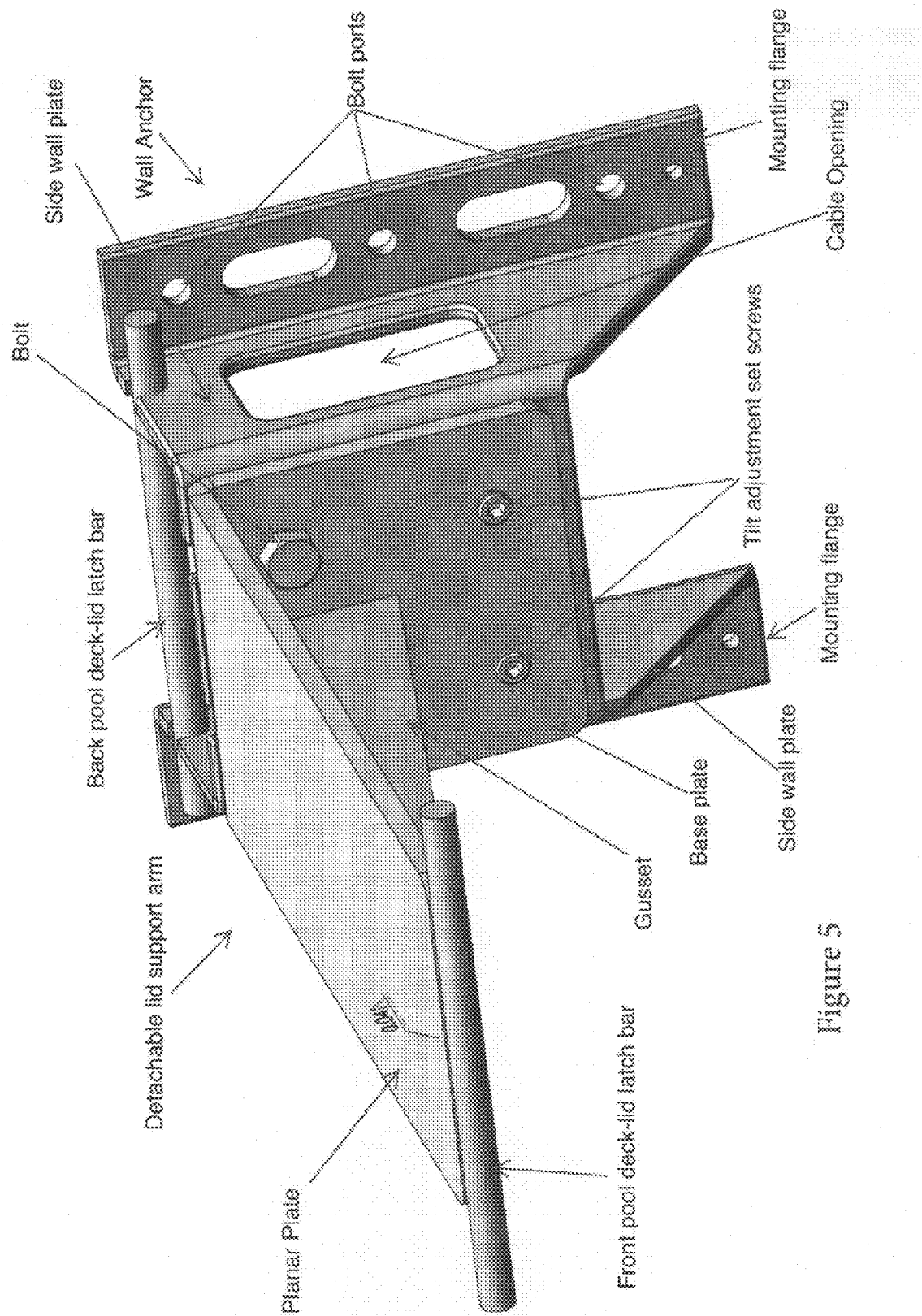
FIG. 5 is a front, left side perspective view of an assembled two-piece detachable bracket with front and back pool deck-lid latch bars welded at the front end of the detachable lid support arm of the bracket and the side wall plates of the wall anchor
Figure 6:
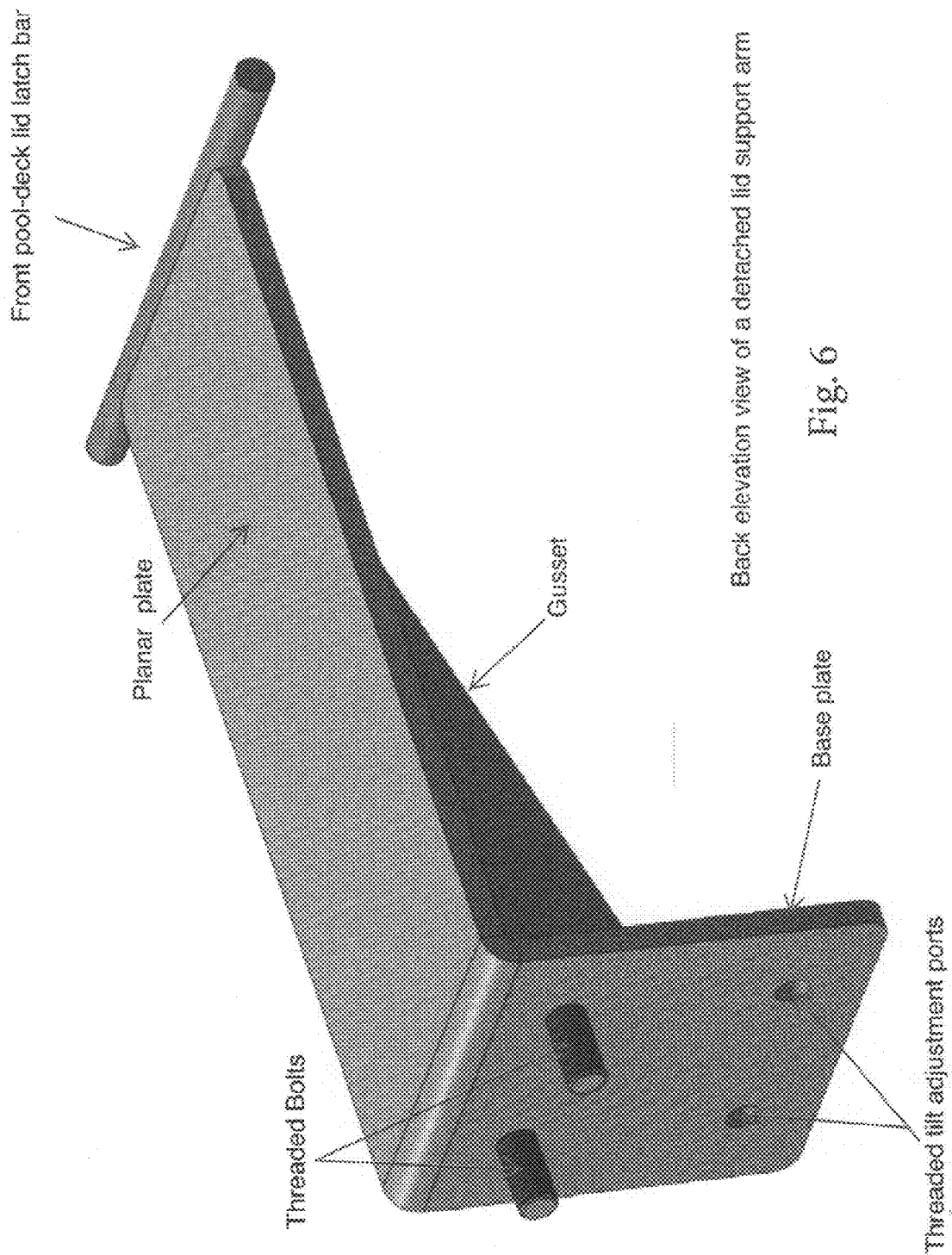
FIG. 6 is a back elevation view of a detachable lid support arm of the two-piece detachable bracket.
Figure 7:
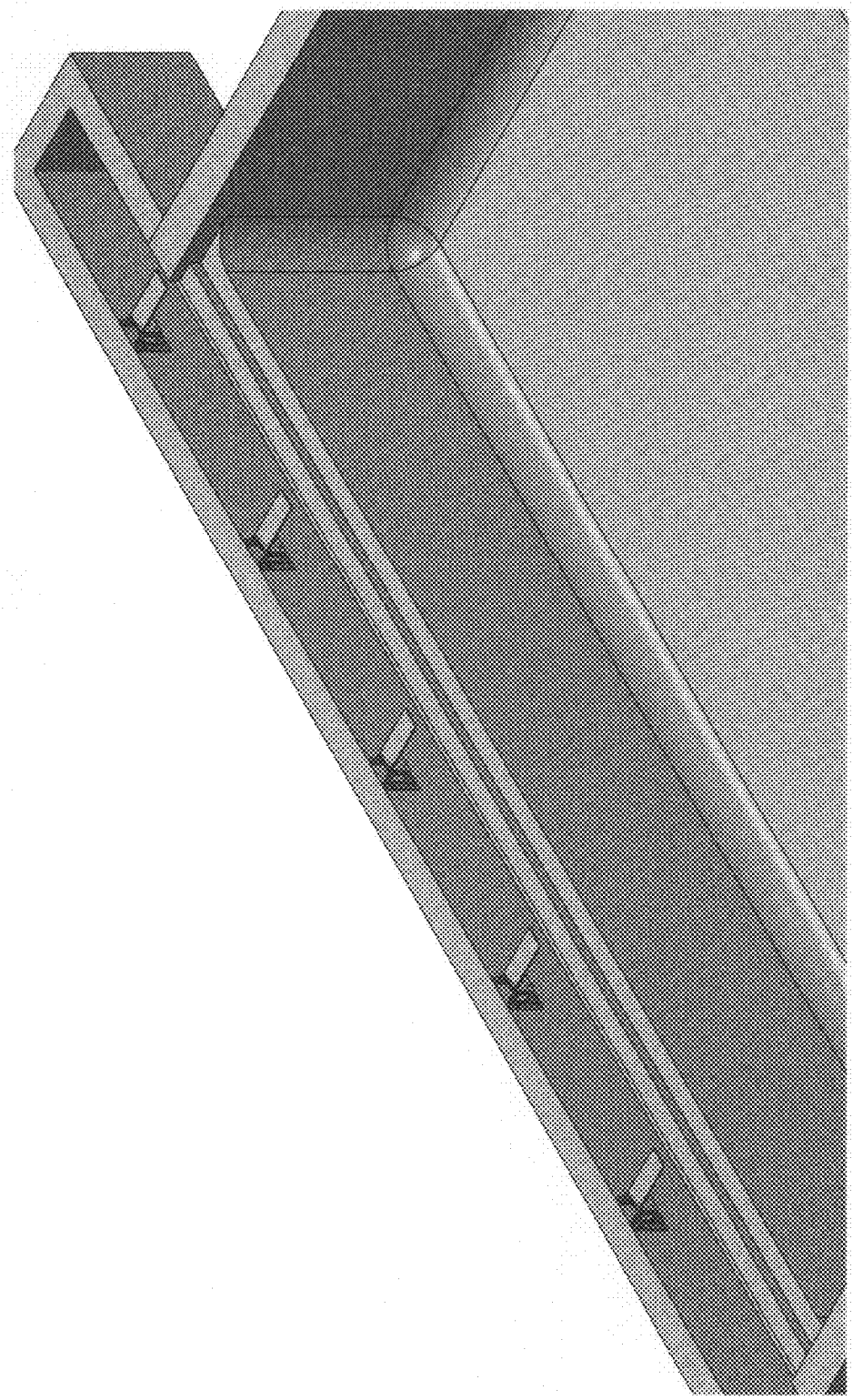
FIG. 7 is a representative, top perspective partial rendering of two-piece detachable brackets installed on the back wall of a below-deck trough for housing an automatic pool cover system at an end of a pool.

Looking at FIGS. 5 & 6, a front pool deck-lid latching bar is fastened (welded) at the distal end of the planar plate of the detachable structural arm. A back pool deck-lid latching is bar fastened to, and supported at the top of the vertical side plates of the wall anchor. The front and back pool deck-lid latching bars engage cooperating structures fastened to or incorporated in the bottom surface structure of the pool deck-lid modules (not shown). The latching bars prevent supported pool-deck lid modules from tipping and from slipping into the pool. As shown, the pool deck-lid latching bars are essentially co-planar, have lengths exceeding the width of the planar plate and are preferably fastened slightly below the top surface of the planar plate. The front and back pool-deck lid latch bars ideally should each extend symmetrically from the two-piece, detachable cantilever bracket for engaging underlying cooperating structural components on the bottoms two adjacent pool deck-lid modules.

As illustrated in FIGS. 1-5, the rectangular clamping plate is simply a flat plate of structural material with a pair bolt ports, spaced and sized to accommodate bolts extending from the bolt ports at the top end of the orthogonal base plate of detachable structural arm, through the parallel depending vertical slots of the mounting plate of the wall anchor for securely sandwiching the vertical mounting plate of the wall anchor between the orthogonal base plate of the detachable structural arm and the clamping plate. In particular, the rectangular plate structurally keeps the slotted section of mounting plate of the wall anchor from deflection, and substantially increases the friction contact area for preventing downward slippage when the nuts screwing on the bolts are tightened securing the structural arm cantilevered at a selected elevation in the depending parallel vertical slots of the planar mounting plate of the wall anchor.

The tilt adjustment set screws adjust the vertical inclination and to a lesser degree, the horizontal inclination of the planar plate of the cantilevered detachable structural arm of the bracket. In particular the set screws screw into the pair of threaded, tilt adjustment ports proximate the bottom end of the orthogonal base plate of the detachable structural against the vertical planar mounting plate of the wall anchor for rotating the attached structural arm principally in a vertical plane by setting the pair at equal elevations relative to the mounting plate surface, and minimally in a horizontal plane by setting the respective set screws at different elevations relative to the mounting plate surface In summary, the described adjustable, two-piece, detachable cantilever bracket is designed for supporting adjacent heavy pool-deck lid modules where each pool-deck lid module bridges over and is supported by two or more underlying brackets between the ends of the pool cover trough. The described adjustment features of the respective brackets can be manipulated to compensate for minor differences in thicknesses and configurations of adjacent supported pool deck-lids the pool cover trough positioned below a junction of two adjacent deck-lid modules and the sides of pool deck at the ends of the pool cover housing trough.

I claim:

1. A detachable, two-piece, cantilever bracket system for supporting heavy pool-deck lid modules covering a below-deck trough with a vertical structural back wall, housing an automatic pool cover system comprising, in combination:
   a) a detachable structural arm presenting a planar plate for supporting the pool-deck lid modules having an orthogonal base plate with a spaced pair of bolt ports located proximate to a top end of the base plate and a spaced pair of threaded tilt ports located proximate to a bottom end of the base plate;
   b) a clamping plate having bolt ports sized and located for registry with the spaced pair bolt ports through the base plate of the structural arm;
   c) a formed wall anchor structure presenting a vertical planar mounting plate elevated by integral, vertical side-wall plates with coaxial openings for accommodating transverse cabling of the pool cover system, and having outward oppositely extending, co-planar wall mounting flanges adapted to be bolted to the back wall inside the below-deck trough, where the planar mounting plate has a pair of parallel vertical slots depending down from its top edge sized and spaced-apart to register with the bolt ports through the base plate of the structural arm;
   d) a plurality of bolts for securing outward extending, co-planar flange plates of the wall anchor to the back wall at a selected elevation inside the below deck trough;
   e) a pair of bolts with nuts securing the base plate of the structural arm to the wall anchor structure clamping the slotted vertical planar mounting plate of the formed wall anchor between the base plate of the structural arm and the clamping plate at selected elevations within the depending parallel vertical slots of the vertical planar mounting plate for setting elevation of the detachable structural arm relative to the below-deck trough; and
   f) a pair of tilt adjustment, set screws sized for screwing through the threaded tilt ports proximate the bottom end of the base plate tilting the base plate of the removable structural arm relative to the vertical planar mounting plate of the formed wall anchor structure for determining and adjusting inclination of the planar plate of the structural arm of the two-piece, detachable cantilever bracket.

* * * * *